(12) United States Patent
Paragano et al.

(10) Patent No.: US 9,325,938 B2
(45) Date of Patent: Apr. 26, 2016

(54) VIDEO CHAT PICTURE-IN-PICTURE

(71) Applicant: Google Inc., Mountain View, CA (US)

(72) Inventors: Laura Paragano, San Francisco, CA (US); David Young Chung, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 110 days.

(21) Appl. No.: 14/208,909

(22) Filed: Mar. 13, 2014

(65) Prior Publication Data

US 2015/0264301 A1 Sep. 17, 2015

(51) Int. Cl.
*H04N 7/14* (2006.01)
*H04L 12/18* (2006.01)

(52) U.S. Cl.
CPC ............ *H04N 7/141* (2013.01); *H04L 12/1813* (2013.01); *H04N 7/147* (2013.01)

(58) Field of Classification Search
CPC .................................................. H04L 12/1813
USPC ................... 348/14.01–14.16; 370/259–271, 370/351–357; 704/270–278; 709/201–207, 709/217–248
See application file for complete search history.

(56) References Cited

U.S. PATENT DOCUMENTS

| | | | | |
|---|---|---|---|---|
| 5,850,211 A * | 12/1998 | Tognazzini | ............. | G06F 3/013 345/158 |
| 7,620,905 B2 * | 11/2009 | Boss | ...................... | G06F 3/0481 715/766 |
| 8,406,457 B2 * | 3/2013 | Matsuoka | .............. | B60K 35/00 382/100 |
| 8,504,937 B2 * | 8/2013 | Jobs | ...................... | G06F 3/0481 715/781 |
| 8,593,504 B2 * | 11/2013 | Lin | ...................... | H04L 12/1827 345/2.2 |
| 8,647,206 B1 * | 2/2014 | Gottlieb | ................... | H04N 7/15 463/40 |
| 2004/0001101 A1 * | 1/2004 | Trajkovic | ................ | G06F 3/147 715/781 |
| 2007/0180398 A1 * | 8/2007 | McArdle | .............. | G06F 3/0481 715/781 |
| 2008/0066006 A1 | 3/2008 | Kim | | |
| 2008/0115081 A1 * | 5/2008 | Sankaravadivelu | ... | G06F 3/0481 715/783 |
| 2008/0295022 A1 | 11/2008 | Valdes et al. | | |
| 2011/0175932 A1 * | 7/2011 | Yu | ........................... | G06F 3/048 345/661 |
| 2012/0102403 A1 * | 4/2012 | Pennington | ............ | H04N 7/148 715/719 |
| 2012/0105257 A1 * | 5/2012 | Murillo | ................. | G06F 9/4443 341/20 |
| 2012/0105486 A1 * | 5/2012 | Lankford | ................ | G06F 3/013 345/661 |

(Continued)

OTHER PUBLICATIONS

Kameka, A., "Skype adds picture-in-picture mode to float over any app in Android," MobileBurn, Dec. 13, 2013, 4 pages.

(Continued)

*Primary Examiner* — Hemant Patel
(74) *Attorney, Agent, or Firm* — Remarck Law Group PLC

(57) ABSTRACT

A computer-implemented technique includes initiating, at a computing device having one or more processors, a video chat session with another computing device via a network. The technique includes displaying, at the computing device, a video chat window in response to initiating the video chat session, the video chat window displaying a video stream received from the other computing device. The technique includes detecting, at the computing device, a lack of interaction between a user of the computing device and the video chat window. The technique also includes in response to detecting the lack of interaction between the user and the video chat window, at least one of automatically resizing and automatically repositioning, at the computing device, the video chat window.

20 Claims, 4 Drawing Sheets

(56) References Cited

U.S. PATENT DOCUMENTS

| | | | |
|---|---|---|---|
| 2012/0287224 A1* | 11/2012 | Paris | H04N 7/147 348/14.08 |
| 2013/0124623 A1* | 5/2013 | Munter | H04L 65/403 709/204 |
| 2013/0174038 A1 | 7/2013 | Sudhakar Palla et al. | |
| 2013/0219299 A1* | 8/2013 | Yerli | G06F 3/0481 715/753 |
| 2013/0339214 A1* | 12/2013 | Buck | G06F 3/013 705/37 |

OTHER PUBLICATIONS

Taboca, "Float Video," https://addons-mozilla.org, Jul. 22, 2009, 4 pages.

International Search Report and Written Opinion dated Jun. 19, 2015 for PCT International Application No. PCT/US2015/019656, 9 pages.

* cited by examiner

VIDEO CHAT PICTURE-IN-PICTURE

FIELD

The present disclosure relates generally to video chat software and, more particularly, to techniques for automatically resizing/repositioning a video chat window for multitasking purposes based on a user's interaction with the video chat window.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Users participating in video chats often are multitasking and using other software. For example, the user may be viewing a text document or a website while also participating in the video chat. This other software, however, may block the video chat window unless resizing/repositioning occurs. Users, therefore, either allow the video chat window to move to the background (behind the other software) or manually resize/reposition the video chat window (and, in some cases, the other software) such that both can be viewed. Having a video chat operating in the background is undesirable due to the lack of a visual connection between users. Having to manually resize/reposition the video chat window, on the other hand, may be difficult and time consuming.

SUMMARY

A computer-implemented technique is presented. The technique can include initiating, at a computing device having one or more processors, a video chat session with another computing device via a network, the video chat session being initiated in a web browser executing at the computing device. The technique can include displaying, at the computing device, a video chat window in the web browser in response to initiating the video chat session, the video chat window displaying a video stream received from the other computing device. The technique can include detecting, at the computing device, a first action by the user indicative of a lack of interaction with the video chat window, the first action including at least one of: (i) input by the user to the computing device that causes a new web browser tab to be displayed at the computing device, and (ii) a lack of eye contact by the user on the video chat window for longer than a first predetermined period based on video data captured by a video camera associated with the computing device. The technique can include in response to detecting the first action, automatically shrinking and repositioning, at the computing device, the video chat window to obtain a modified video chat window. The technique can include detecting, at the computing device, a second action by the user indicative of interaction with the video chat window, the second action including at least one of: (i) a lack of input by the user via at least one of a keyboard, a mouse, and a touch display associated with the computing device for longer than a second predetermined period, (ii) voice data captured by a microphone associated with the computing device for longer than a third predetermined period, and (iii) eye contact by the user on the modified video chat window for longer than a fourth predetermined period based on the video data captured by the video camera. The technique can also include in response to detecting the second action, automatically enlarging and repositioning, at the computing device, the modified video chat window to obtain the video chat window.

Another computer implemented is also presented. The technique can include initiating, at a computing device having one or more processors, a video chat session with another computing device via a network. The technique can include displaying, at the computing device, a video chat window in response to initiating the video chat session, the video chat window displaying a video stream received from the other computing device. The technique can include detecting, at the computing device, a lack of interaction between a user of the computing device and the video chat window. The technique can include in response to detecting the lack of interaction between the user and the video chat window, at least one of automatically resizing and automatically repositioning, at the computing device, the video chat window.

In some embodiments, the lack of interaction includes a lack of eye contact by the user on the video chat window for longer than a first predetermined period.

In other embodiments, the technique further includes detecting the lack of eye contact by the user on the video chat window based on the video data captured by the video camera with respect to the computing device.

In some embodiments, at least one of automatically resizing and automatically repositioning the video chat window further includes: in response to detecting the lack of interaction between the user and the video chat window, automatically shrinking, at the computing device, the video chat window to obtain a modified video chat window, and automatically repositioning, at the computing device, the modified video chat window to a corner of the display.

In other embodiments, the technique further includes: detecting, at the computing device, interaction between the user and the modified video chat window, and in response to detecting the interaction between the user and the modified video chat window, automatically enlarging the modified video chat window to obtain the video chat window.

In some embodiments, the interaction includes a lack of input by the user via at least one of a keyboard, a mouse, and the display associated with the computing device for longer than a second predetermined period.

In other embodiments, the interaction includes voice data captured by a microphone associated with the computing device for longer than a third predetermined period.

In some embodiments, the interaction includes eye contact by the user on the video chat window for longer than a fourth predetermined period based on video data captured by a video camera associated with the computing device.

In other embodiments, the video chat session is implemented by a video chat application extension or add-on in a web browser executing at the computing device, wherein the video chat window is displayed in the web browser.

In some embodiments, the lack of interaction includes input by the user to the computing device that causes a new web browser tab to be displayed at the computing device.

A computing device is also presented. The computing device can include a video camera, a communication device, one or more processors, and a display. The video camera can be configured to capture video data with respect to the computing device. The communication device can be configured for communication with another computing device via a network. The one or more processors can be configured to initiate a video chat session with the other computing device. The one or more processors can be configured to output a video chat window at the display in response to initiating the video chat session, the video chat window configured to display a video stream received from the other computing device. The one or more processors can be configured to detect a lack of interaction between a user of the computing device and the video chat window. The one or more processors can also be configured to in response to detecting the lack of interaction between the lack of interaction between the user and the video chat window, at least one of automatically resize and automatically reposition the video chat window. The display can be configured to display the video chat window.

In some embodiments, the lack of interaction includes a lack of eye contact by the user on the video chat window for longer than a first predetermined period.

In other embodiments, the one or more processors are further configured to detect the lack of eye contact by the user on the video chat window based on the video data captured by the video camera.

In some embodiments, the one or more processors are configured to: in response to detecting the lack of interaction between the user and the video chat window, automatically shrink the video chat window to obtain a modified video chat window, wherein the display is further configured to display the modified video chat window, and automatically reposition the modified video chat window to a corner of the display.

In other embodiments, the one or more processors are further configured to: detect interaction between the user and the modified video chat window; and in response to detecting the interaction between the user and the modified video chat window, automatically enlarge the modified video chat window to obtain the video chat window.

In some embodiments, the interaction includes a lack of input by the user via at least one of a keyboard associated with the computing device, a mouse associated with the computing device, and the display when the display is a touch display, for longer than a second predetermined period.

In other embodiments, the interaction includes voice data captured by a microphone associated with the computing device for longer than a third predetermined period.

In some embodiments, the interaction includes eye contact by the user on the video chat window for longer than a fourth predetermined period based on the video data captured by the video camera.

In other embodiments, the video chat session is implemented by a video chat application extension or add-on in a web browser executing at the computing device, wherein the video chat window is displayed in the web browser, and wherein the lack of interaction includes input by the user to the computing device that causes a new web browser tab to be displayed at the computing device.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously discussed, having to manually resize/reposition a video chat window in order for a user to multitask is an inconvenient and time consuming process. Accordingly, video chat picture-in-picture (PIP) techniques are presented. The term PIP refers to a smaller video window, e.g., a video chat window, operating within another larger window, e.g., a web browser window. The techniques of the present disclosure include automatically resizing/repositioning a video chat window based on a user's interaction (or lack of interaction) with the video chat window and without any manual resizing/repositioning or other similar input by the user. These techniques can be particularly useful for the user's multitasking purposes, e.g., video chatting and web browsing or document editing simultaneously.

Figure 1:
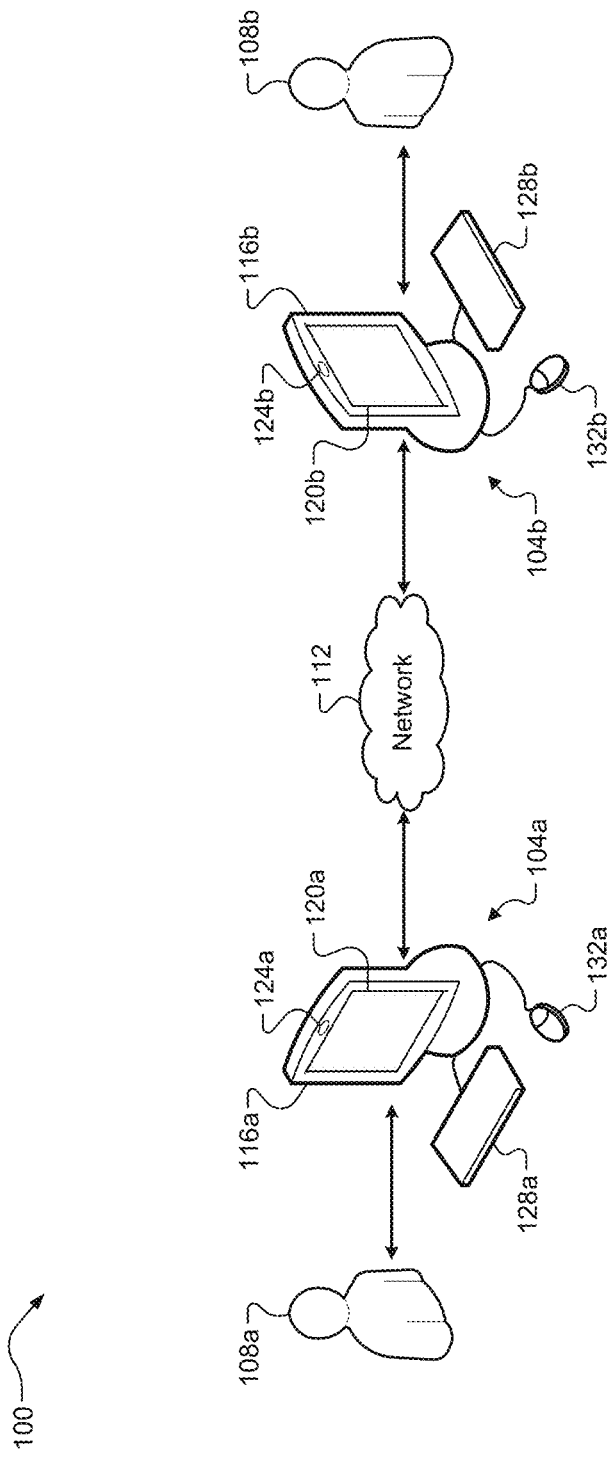
FIG. 1 is a diagram of a computing network including an example computing device according to some implementations of the present disclosure.

Referring now to FIG. 1, a diagram of an example computing system 100 is illustrated. The computing system 100 can include computing devices 104a and 104b (collectively "computing devices 104") that are operated by users 108a and 108b (collectively "users 108"), respectively. The computing devices 104 can be configured to communicate with each other via a network 112. Examples of the computing devices 104 include desktop computers, laptop computers, tablet computers, and mobile phones. While two computing devices 104 are illustrated, it should be appreciated that the computing network 100 can include three or more computing devices 104 that can communicate with each other for a group video chat session. The network 112 can include a local area network (LAN), a wide area network (WAN), e.g., the Internet, or a combination thereof.

In some implementations, the computing devices 104 include peripheral components. The computing devices 104 include displays 116a and 116b (collectively "displays 116") having display areas 120a and 120b (collectively "display areas 120"), respectively. In some implementations, the displays 116 are touch displays. The computing devices 104 also include video cameras 124a and 124b (collectively "video cameras 124"). The video cameras 124 can each be configured to capture video data with respect to its respective computing device 104. For example, the video cameras 124 can be configured to capture video data of the users 108. The computing devices 104 can also include other input devices, such as keyboards 128a and 128b (collectively "keyboards 128") and mice 132a and 132b (collectively "mice 132").

Figure 2:
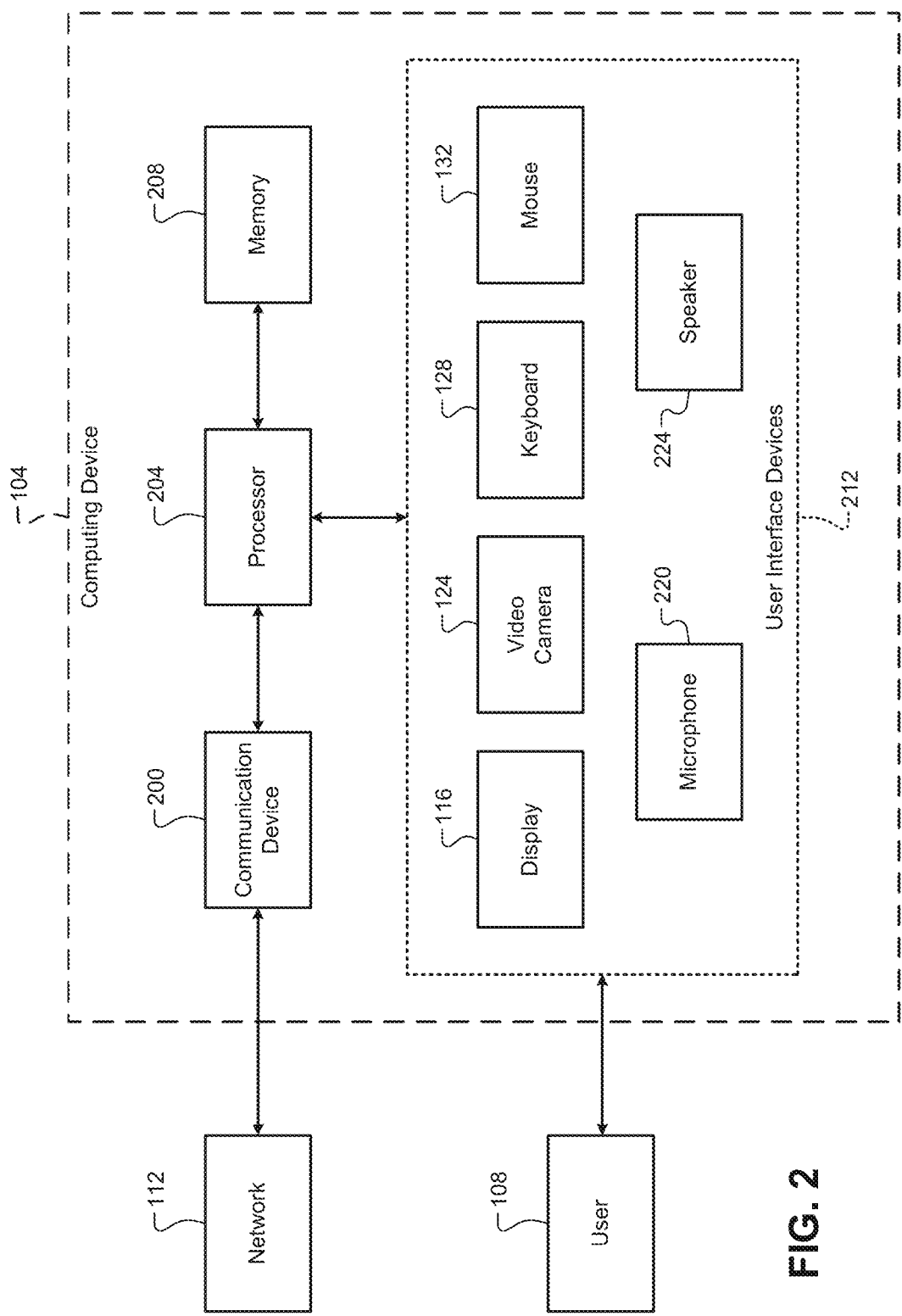
FIG. 2 is a functional block diagram of the example computing device of FIG. 1.

Referring now to FIG. 2, a functional block diagram of one of the example computing devices 104 is illustrated. While a single computing device 104 and its associated user 108 and components 116-132 are referred to from hereon, it should be appreciated that both computing devices 104 can have the same or similar configuration and thus can operate in the same or similar manner. The computing device 104 can include a communication device 200, a processor 204, and a memory 208. The computing device 104 can also include the display 116, the video camera 124, the keyboard 128, and the mouse 132 (collectively "user interface devices 212"). The user interface devices 212 are configured for interaction with the user 108. In some implementations, the user interface 212 can further include a microphone 220 and a speaker 224.

The communication device 200 is configured for communication between the processor 204 and other devices, e.g., the other computing device 104, via the network 112. The communication device 200 can include any suitable communication components, such as a transceiver. Specifically, the communication device 200 can transmit a request to initiate the video chat session and can provide a response to this request to the processor 204. The communication device 200 can then handle transmission and receipt of the various video streams between the computing devices 200 during the video chat session. The memory 208 can be configured to store information at the computing device 104, such as video chat settings for the user 108, which are discussed in greater detail below. The memory 208 can be any suitable storage medium (flash, hard disk, etc.).

The processor 204 can be configured to control operation of the computing device 104. It should be appreciated that the term "processor" as used herein can refer to both a single processor and two or more processors operating in a parallel or distributed architecture. The processor 204 can be configured to perform general functions including, but not limited to, loading/executing an operating system of the computing device 104, controlling communication via the communication device 200, and controlling read/write operations at the memory 208. The processor 204 can also be configured to perform specific functions relating to at least a portion of the present disclosure including, but not limited to, loading/executing web browser software at the computing device 104, initiating/controlling the video chat session, and controlling the display 116, including resizing/repositioning the video chat window, which is described in greater detail below with reference to FIG. 3.

Figure 3:
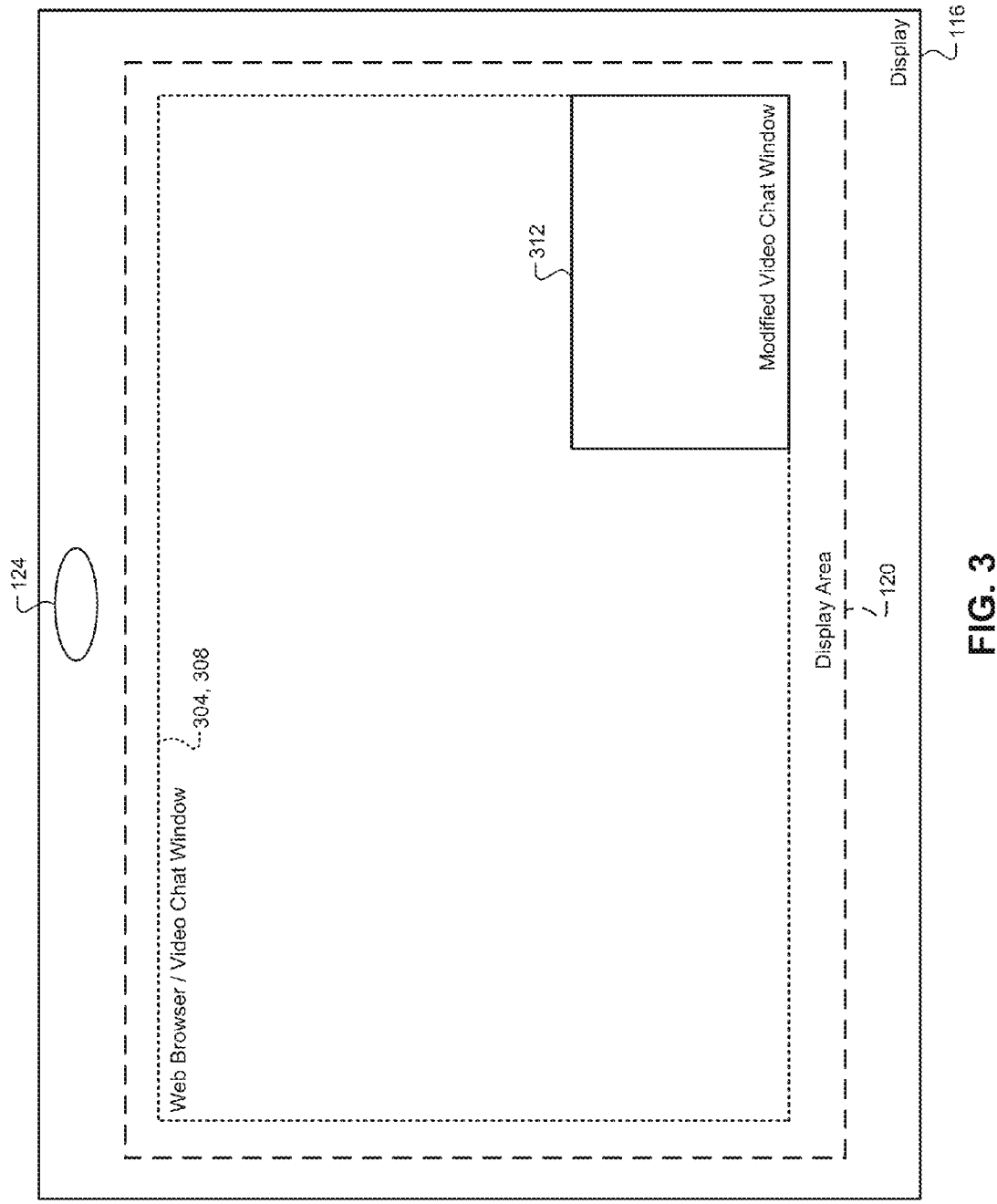
FIG. 3 is a view of a display of the example computing device of FIG. 1. displaying a web browser having a modified video chat window.

Referring now to FIG. 3, a diagram of the display 116 of one of the example computing devices 104 is illustrated. The computing device 104 can load and execute a web browser 304, which is illustrated as a window with respect to the display area 120 of the display 116. While the web browser 304 is specifically discussed, it should be appreciated that the video chat session could be initiated via an operating system or another application, such as a standalone video chat application. The web browser 304 may not occupy the entire display area 120, e.g., due to toolbars or other borders (not shown). The web browser 304 is configured to initiate the video chat session, which includes displaying a video chat window 308. As illustrated, the video chat window 308 occupies the entirety of the web browser 304. It should be appreciated, however, that the video chat window 308 could occupy a majority of, but less than the entire web browser 304, e.g., due to toolbars or other borders. The video chat window 308 can also be referred to as a full or maximized video chat window 308. In one implementation, the video chat window 308 can be a default configuration in response to initiating the video chat session.

A modified video chat window 312 is also illustrated. The modified video chat window 312 represents a resized and repositioned version of the video chat window 308. As illustrated, the video chat window 308 has been shrunk and repositioned to a bottom right corner of the web browser 304 to obtain the modified video chat window 312. It should be appreciated that other configurations for the modified video chat window 312 could be implemented, such as smaller/top right, smaller/top left, or smaller/bottom left. In one implementation, the specific configuration of the modified video chat window 312 can be customizable by the user 108. For example, the user 108 may prefer having the modified video chat window 312 in a specific size and/or position configuration to optimize their multitasking efficiency or because of visual impairments of the user 108. In some implementations, the modified video chat window 312 can also follow transitions by the user 108 to other tabs of the web browser 304, which is described in greater detail below. The term "tab" can refer to another web page being displayed within a single web browser window, and the various tabs could be displayed along a toolbar or border, e.g., at a top of the web browser 304.

Referring again to FIG. 2 and with continued reference to FIG. 3, the processor 204 can load and execute the web browser 304. Via the web browser 304, the user 108 can initiate the video chat session. For example, the user 108 can select an option within the web browser 304 to initiate the video chat session. This can be referred to as a request from the user 108 to initiate the video chat session. In response to receiving this request, the processor 204 can initiate the video chat session with the other computing device, e.g., computing device 104b, which can include a handshake operation and then transmitting/receiving respective video streams via the communication device 200. The processor 204 can then output the received video stream in the video chat window 308 via the display 116. As previously discussed, the default configuration could be the full or maximized video chat window 308.

During the video chat session, the user 108 can interact with the video chat window 308 in different ways. In some cases, the user 108 may wish to multitask during the video chat session. For example, the user 108 may wish to view a web page during the video chat session. In these cases, the user 108 can perform actions that are indicative of a lack of interaction with the video chat window 308. One example action that is indicative of a lack of interaction is the user 108 providing input to open a new tab of the web browser 304. In some cases, the user 108 could open a new window of the web browser 304, and the video chat session could then be transferred to the new web browser window. Another example action that is indicative of a lack of interaction is a lack of eye contact with the video chat window 308 for longer than a first predetermined period. The eye contact by the user 108 could be detected by the processor 204 by analyzing video data captured by the video camera 124 using suitable video processing algorithms. The first predetermined period could be, for example, a few seconds, and in some implementations, could be specified by the user 108.

It should be appreciated that the phrases "lack of interaction," "lack of eye contact," and "lack of input" as used herein can refer to no interaction, no eye contact, and no input, respectively, or to levels of interaction, eye contact, and input less than a specific threshold. For example only, a lack of eye contact could be detected even though the user 108 makes split-second eye contact with the specific video chat window during the respective predetermined period. Similarly, for example only, a lack of input could be detected even though the user 108 makes a single input, such as an accidental input, via one or more of the user input devices 212 during the respective predetermined period.

In response to detecting at least one of these actions indicative of a lack of interaction with the video chat window 308, the processor 204 can automatically resize and/or reposition the video chat window 308 to obtain the modified video chat window 312. As shown in FIG. 3, the processor 204 can shrink the video chat window 308 and reposition the video chat window 308 to the bottom right corner of the web browser 304 to obtain the modified video chat window 312. In some implementations, the processor 204 could shrink and not reposition the video chat window 308 to obtain the modified video chat window 312. In other implementations where the video chat window 308 is not full or maximized, the processor 204 could reposition and not shrink the video chat window 308 to obtain the modified video chat window 312. If the action by the user 108 was opening a new tab in the web browser 304, the modified video chat window 312 could also be displayed in the new tab of the web browser 304, effectively following the user 108 across the various tabs. In one implementation, the video chat session is configured via an extension or add-on to the web browser 304. In this manner, manipulation of the modified video chat window 312 across different tabs can be easily and seamlessly achieved.

During the video chat session, the user 108 may wish to interact with the modified video chat window 312 to a greater degree. For example, the user 108 may be done with multitasking. In these cases, the user 108 can perform other actions indicative of interaction with the modified video chat window 312. One example of these actions is a lack of physical/touch input by the user 108 for longer than a second predetermined period. This physical/touch input by the user 108 can include input via the keyboard 128, the mouse 132, or the display 116 when the display 116 is a touch display. Like the first predetermined period, the second predetermined period could be, for example, a few seconds, and in some implementations, could be specified by the user 108. The lack of a physical/touch input can indicate that the user 108 is done multitasking. Another example of these actions is detection of voice data, which is captured by the microphone 220, for longer than a third predetermined period. The detection of voice data by the microphone 220 indicates that the user 108 is providing speech input and is thus interacting with the modified video chat window 312.

The processor 204 can receive the voice data and process the voice data using suitable voice processing algorithms to detect the speech input by the user 108, e.g., as opposed to other background noise or the other user's voice being output by the speaker 224 as part of the video chat session. While this action is described as voice data for longer than the third predetermined period, it should be appreciated that there can be short gaps (silence) during the voice data, which could correspond to breaks between words or sentences. Like the first and second predetermined periods, the third predetermined period could be, for example, a few seconds, or in some implementations, could be specified by the user 108. Another one of these actions can be eye contact with the modified video chat window 312 for longer than a fourth predetermined period, which can be detected by the processor 204 using the video camera 124 as described above. Like the first, second, and third predetermined periods, the fourth predetermined period could be, for example, a few seconds, or in some implementations, could be specified by the user 108. In one implementation, the first, second, third, and fourth predetermined periods could all be the same.

In response to detecting at least one of these actions indicative of interaction by the user 108 with the modified video chat window 312, the processor 204 can automatically resize and/or reposition the modified video chat window 312 to obtain the video chat window 308. As shown in FIG. 3, the processor 204 can enlarge the modified video chat window 312 and reposition the modified video chat window 312 to the center of the web browser 304 to obtain the video chat window 308. In some implementations, the processor 204 could enlarge and not reposition the modified video chat window 312 to obtain the video chat window 308. In other implementations where the video chat window 308 was not previously full or maximized, the processor 204 could reposition and not enlarge the modified video chat window 312 to obtain the video chat window 308.

While specific actions indicative of interaction and lack of interaction by the user 108 with the video chat windows 308, 312 are discussed herein, it should be appreciated that other suitable actions could be detected to determine the interaction and/or lack of interaction by the user 108 with the video chat windows 308, 312. Furthermore, in some implementations, the automatic resizing/repositioning feature could be selectively disabled. For example only, when a screen share feature of the video chat session is being utilized, the automatic resizing/repositioning feature could be disabled to prevent interruption with the screen share. In other words, the screen share feature is much less useable via a smaller modified video chat window 312 compared to a larger video chat window 308. For example, the screen share feature may have a default configuration of the full or maximized video chat window 308.

Figure 4:
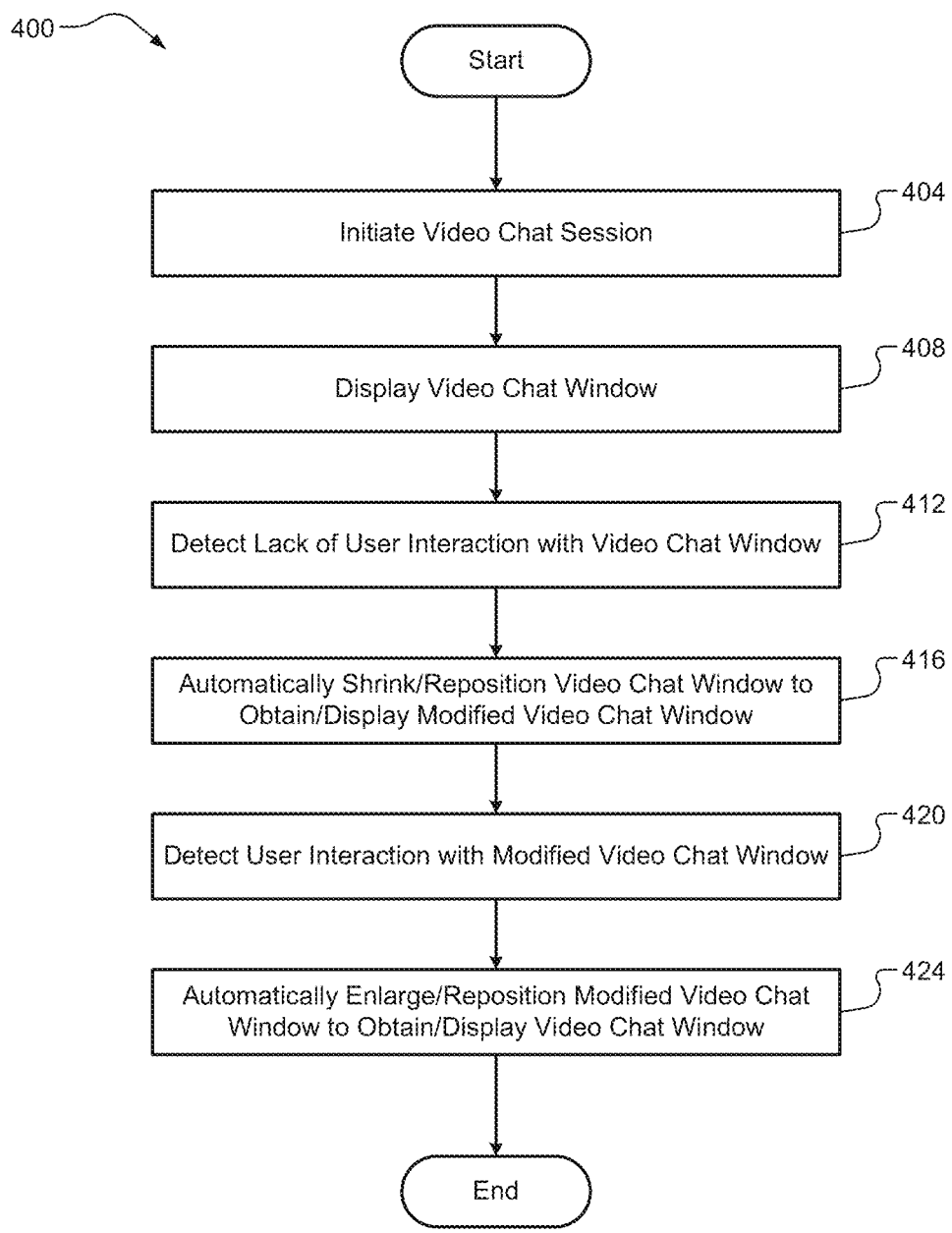
FIG. 4 is a flow diagram of an example technique for resizing/repositioning a video chat window based on a user's interaction with the video chat window according to some implementations of the present disclosure.

Referring now to FIG. 4, a flow diagram of an example technique 400 for automatically resizing/repositioning the video chat window 308 based on interaction by the user 108a with the video chat window 308 is illustrated. At 404, computing device 104a can initiate the video chat session with computing device 104b via the network 112. In one implementation, the video chat session can be initiated in a web browser 304 executing at the computing device 104a. At 408, computing device 104a can display the video chat window 308 in the web browser 304 in response to initiating the video chat session. The video chat window 308 can display a video stream received from the other computing device 104b. At 412, computing device 104a can detect a first action by the user 108a indicative of a lack of interaction with the video chat window 308. Examples of the first action include at least one of: (i) input by the user 108a to the computing device 108a that causes a new web browser tab to be displayed at the computing device 104a, and (ii) a lack of eye contact by the user 108a on the video chat window 308 for longer than a first predetermined period based on video data captured by a video camera 124a associated with the computing device 104a.

In response to detecting the first action, the computing device 104a can automatically shrink and reposition the video chat window 308 to obtain the modified video chat window 312 at 416. In other words, the computing device 104a can automatically shrink and reposition the video chat window 308 directly in response to detecting the lack of user interaction with the video chat window 308 and without any user action or intervention. In this manner, the video chat window 308 can be shrunk and repositioned to obtain the modified video chat window 312 without any explicit/manual action by the user 108a, thereby providing a seamless transition from the video chat window 308 to the modified video chat window 312 based only on the user's lack of interaction with the video chat window 308. This seamless transition can allow the user 108a to easily multitask during the video chat session. This seamless transition can also be performed when enlarging and repositioning the modified video chat window 312 to obtain the video chat window 308, which is described in greater detail below.

At 420, computing device 104a can detect a second action by the user 108a indicative of interaction with the modified video chat window 312. Examples of the second action include at least one of: (i) a lack of input by the user 108a via at least one of a keyboard 128a, a mouse 132a, and a touch display associated with the computing device 104a for longer than a second predetermined period, (ii) voice data captured by the microphone 220 associated with the computing device 104a for longer than a third predetermined period, and (iii) eye contact by the user 108a on the modified video chat window 312 for longer than a fourth predetermined period based on the video data captured by the video camera 124*a*. At 424, computing device 104*a* can automatically enlarge and reposition the modified video chat window 312 in response to detecting the second action to obtain the video chat window 308. The technique 400 can then end or return to 404 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   initiating, at a computing device having one or more processors, a video chat session with another computing device via a network, the video chat session being initiated in a web browser executing at the computing device;
   displaying, at the computing device, a video chat window in the web browser in response to initiating the video chat session, the video chat window displaying a video stream received from the other computing device;
   detecting, at the computing device, a first action by the user indicative of a lack of interaction with the video chat window, the first action including at least one of:
     (i) input by the user to the computing device that causes a new web browser tab to be displayed at the computing device, and
     (ii) a lack of eye contact by the user on the video chat window for longer than a first predetermined period based on video data captured by a video camera associated with the computing device;
   in response to detecting the first action, automatically shrinking and repositioning, at the computing device, the video chat window to obtain a modified video chat window;
   displaying, at the computing device, the modified video chat window in the web browser, the modified video chat window displaying the video stream;
   detecting, at the computing device, a second action by the user indicative of interaction with the video chat window, the second action including at least one of:
     (i) a lack of input by the user via at least one of a keyboard, a mouse, and a touch display associated with the computing device for longer than a second predetermined period,
     (ii) voice data captured by a microphone associated with the computing device for longer than a third predetermined period, and
     (iii) eye contact by the user on the modified video chat window for longer than a fourth predetermined period based on the video data captured by the video camera; and
   in response to detecting the second action, automatically enlarging and repositioning, at the computing device, the modified video chat window to obtain the video chat window.

2. A computer implemented method, comprising:
   initiating, at a computing device having one or more processors, a video chat session with another computing device via a network;
   displaying, at the computing device, a video chat window in response to initiating the video chat session, the video chat window displaying a video stream received from the other computing device;
   detecting, at the computing device, a lack of interaction between a user of the computing device and the video chat window;
   in response to detecting the lack of interaction between the user and the video chat window, at least one of automatically resizing and automatically repositioning, at the computing device, the video chat window to obtain a modified video chat window; and
   displaying, at the computing device, the modified video chat window, the modified video chat window displaying the video stream.

3. The computer-implemented method of claim 2, wherein the lack of interaction includes a lack of eye contact by the user on the video chat window for longer than a first predetermined period.

4. The computer-implemented method of claim 3, further comprising detecting the lack of eye contact by the user on the video chat window based on the video data captured by the video camera with respect to the computing device.

5. The computer-implemented method of claim 2, wherein at least one of automatically resizing and automatically repositioning the video chat window includes:
   in response to detecting the lack of interaction between the user and the video chat window, automatically shrinking, at the computing device, the video chat window to obtain the modified video chat window; and
   automatically repositioning, at the computing device, the modified video chat window to a corner of the display.

6. The computer-implemented method of claim 5, further comprising:
   detecting, at the computing device, interaction between the user and the modified video chat window; and
   in response to detecting the interaction between the user and the modified video chat window, automatically enlarging the modified video chat window to obtain the video chat window.

7. The computer-implemented method of claim 6, wherein the interaction includes a lack of input by the user via at least one of a keyboard, a mouse, and the display associated with the computing device for longer than a second predetermined period.

8. The computer-implemented method of claim 6, wherein the interaction includes voice data captured by a microphone associated with the computing device for longer than a third predetermined period.

9. The computer-implemented method of claim 6, wherein the interaction includes eye contact by the user on the video chat window for longer than a fourth predetermined period based on video data captured by a video camera associated with the computing device.

10. The computer-implemented method of claim 2, wherein the video chat session is implemented by a video chat application extension or add-on in a web browser executing at the computing device, wherein the video chat window is displayed in the web browser.

11. The computer-implemented method of claim 2, wherein the lack of interaction includes input by the user to the computing device that causes a new web browser tab to be displayed at the computing device.

12. A computing device, comprising:
- a video camera configured to capture video data with respect to the computing device;
- a communication device configured for communication with another computing device via a network;
- one or more processors configured to:
  - initiate a video chat session with the other computing device,
  - output a video chat window at the display in response to initiating the video chat session, the video chat window displaying a video stream received from the other computing device,
  - detect a lack of interaction between a user of the computing device and the video chat window, and
  - in response to detecting the lack of interaction between the user and the video chat window, at least one of automatically resize and automatically reposition the video chat window to obtain a modified video chat window displaying the video stream; and
- a display configured to display, at a particular time, the video chat window or the modified video chat window.

13. The computing device of claim 12, wherein the lack of interaction includes a lack of eye contact by the user on the video chat window for longer than a first predetermined period.

14. The computing device of claim 12, wherein the one or more processors are configured to:
- in response to detecting the lack of interaction between the user and the video chat window, automatically shrink the video chat window to obtain the modified video chat window, wherein the display is further configured to display the modified video chat window; and
- automatically reposition the modified video chat window to a corner of the display.

15. The computing device of claim 14, wherein the one or more processors are further configured to:
- detect interaction between the user and the modified video chat window; and
- in response to detecting the interaction between the user and the modified video chat window, automatically enlarge the modified video chat window to obtain the video chat window.

16. The computing device of claim 15, wherein the interaction includes a lack of input by the user via at least one of a keyboard associated with the computing device, a mouse associated with the computing device, and the display when the display is a touch display, for longer than a second predetermined period.

17. The computing device of claim 15, wherein the interaction includes voice data captured by a microphone associated with the computing device for longer than a third predetermined period.

18. The computing device of claim 15, wherein the interaction includes eye contact by the user on the video chat window for longer than a fourth predetermined period based on the video data captured by the video camera.

19. The computing device of claim 12, wherein the video chat session is implemented by a video chat application extension or add-on in a web browser executing at the computing device, wherein the video chat window is displayed in the web browser, and wherein the lack of interaction includes input by the user to the computing device that causes a new web browser tab to be displayed at the computing device.

20. A non-transitory computer readable medium storing instructions that, when executed by a computing device having one or more processors, cause the computing device to perform operations, the operations comprising:
- initiating a video chat session with another computing device via a network;
- displaying a video chat window in response to initiating the video chat session, the video chat window displaying a video stream received from the other computing device;
- detecting a lack of interaction between a user of the computing device and the video chat window;
- in response to detecting the lack of interaction between the user and the video chat window, at least one of automatically resizing and automatically repositioning the video chat window to obtain a modified video chat window; and
- displaying the modified video chat window, the modified video chat window displaying the video stream.

* * * * *